United States Patent
Sumiyoshi et al.

(10) Patent No.: US 10,339,381 B2
(45) Date of Patent: Jul. 2, 2019

(54) CONTROL APPARATUS, CONTROL SYSTEM, AND CONTROL METHOD

(71) Applicant: HITACHI, LTD., Tokyo (JP)

(72) Inventors: Takashi Sumiyoshi, Tokyo (JP); Yoshitaka Hiramatsu, Tokyo (JP); Masahito Togami, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 15/648,568

(22) Filed: Jul. 13, 2017

(65) Prior Publication Data

US 2018/0018520 A1 Jan. 18, 2018

(30) Foreign Application Priority Data

Jul. 15, 2016 (JP) .................................. 2016-140185

(51) Int. Cl.
*B25J 9/16* (2006.01)
*G06K 9/00* (2006.01)
(Continued)

(52) U.S. Cl.
CPC ........ *G06K 9/00664* (2013.01); *B25J 9/1697* (2013.01); *B25J 13/003* (2013.01); (Continued)

(58) Field of Classification Search
CPC ........ B25J 9/1697; B25J 13/003; B25J 13/08; G10L 17/005; G06K 9/6215; (Continued)

(56) References Cited

U.S. PATENT DOCUMENTS

2004/0117063 A1* 6/2004 Sabe ................. G05B 19/4097
  700/245
2005/0004710 A1 1/2005 Shimomura et al.
(Continued)

FOREIGN PATENT DOCUMENTS

JP 2005-131713 A 5/2005
JP 2008-142876 A 6/2008
(Continued)

OTHER PUBLICATIONS

Search Report issued in counterpart EP Application No. 17179639.4 dated Dec. 19, 2017.

*Primary Examiner* — Vincent Rudolph
*Assistant Examiner* — Pinalben Patel
(74) *Attorney, Agent, or Firm* — Volpe and Koenig, P.C.

(57) ABSTRACT

A control apparatus is configured to execute: acquisition processing of acquiring, from at least one data acquisition apparatus, as data on a second object, time series data on a series of pieces of information on the second object that has been collected since the at least one data acquisition apparatus detected the second object; determination processing of determining whether or not the first and the second object are identical to each other based on information on the first and the second object; and storage processing of storing, when the determination processing results that the first and the second object are/aren't identical to each other, the data on the second object and the data on the first object in association with/without each other, and when the determination processing results in a determination that the first object and the second object are not identical to each other.

8 Claims, 11 Drawing Sheets

(51) Int. Cl.
*G06K 9/62* (2006.01)
*B25J 13/00* (2006.01)
*B25J 13/08* (2006.01)
*G10L 17/00* (2013.01)
*G05B 19/042* (2006.01)

(52) U.S. Cl.
CPC .......... *B25J 13/08* (2013.01); *G05B 19/0425* (2013.01); *G06K 9/00288* (2013.01); *G06K 9/00369* (2013.01); *G06K 9/6215* (2013.01); *G10L 17/005* (2013.01); *Y10S 901/01* (2013.01)

(58) Field of Classification Search
CPC .......... G06K 9/00664; G06K 9/00288; G06K 9/00369; G05B 19/0425; Y10S 901/01
See application file for complete search history.

(56) References Cited

U.S. PATENT DOCUMENTS

| | | | |
|---|---|---|---|
| 2011/0026782 A1* | 2/2011 | Ego | G06K 9/00288 382/118 |
| 2013/0243246 A1* | 9/2013 | Lao | G06K 9/00255 382/103 |
| 2014/0331157 A1 | 11/2014 | Yoshigahara et al. | |
| 2016/0379370 A1* | 12/2016 | Nakazato | G06K 9/4604 382/103 |
| 2017/0083741 A1* | 3/2017 | Gao | G06K 9/00013 |
| 2017/0178372 A1* | 6/2017 | Gormish | G06T 11/60 |
| 2018/0107898 A1* | 4/2018 | Bhat | G06K 9/6215 |

FOREIGN PATENT DOCUMENTS

| | | |
|---|---|---|
| JP | 2012-161851 A | 8/2012 |
| WO | 2003/035334 A1 | 5/2003 |

* cited by examiner

CONTROL APPARATUS, CONTROL SYSTEM, AND CONTROL METHOD

CLAIM OF PRIORITY

The present application claims priority from Japanese patent application JP 2016-140185 filed on Jul. 15, 2016, the content of which is hereby incorporated by reference into this application.

BACKGROUND

This invention relates to a control apparatus, control system, and control method for controlling a data acquisition apparatus group.

In recent years, there have been widely developed service robots for providing various kinds of services while moving in a human space. Some service robots with a human-like appearance provide services that are in line with intentions of users through communication via voices or gestures. In order to grasp the intentions of users accurately, such robots need to grasp situations of the users and robots or past events as well as voices or gestures made by the users.

For example, JP 2012-161851 A discloses a robot configured to: detect positions and orientations of users and the robot with a known motion capture system and an infrared reflective marker; move to form a positional relationship (formation) for enabling conversation; and start a conversation. JP 2012-161851 A discloses several specific conditions, such as line-of-sight areas and fields of view of the users and the robot and distances between the users and the robot, as the definition of the positional relationship for enabling conversation.

Further, for example, JP 2008-142876 A discloses a method of distinguishing between service recipients. JP 2008-142876 A achieves sophisticated services that a potential service recipient is determined by an action recognition sensor, and a robot performs a confirmation operation.

Further, for example, WO 2003/035334 A1 discloses a method involving recognizing surroundings of a robot with at least one means, detecting a target (object) based on the recognition result, and holding information on the target.

Further, for example, JP 2005-131713 A discloses a robot configured to determine a conversation partner and action of the robot based on an action history of a conversation target (user), which is acquired by various kinds of observation apparatus installed in surroundings, to thereby introduce or recommend an exhibited object in an exhibition hall.

In general, service robots are required to provide a plurality of types of services such as guiding, attracting customers, assisting sales, and performing patrol monitoring. The services to be provided need to be selected appropriately depending on the situation without preliminary designation by an adopter of the robot, and then provided. In that case, it is desirable to store, for example, information acquired by sensing the surroundings, information on the users, and past interaction history information into a database, and share those pieces of information among services.

Further, the types of services are strongly desired to be extensible in preparation for future needs. Functions to be shared by services need to be provided in a format, for example, a software library, which can be used easily by service developers. However, none of JP 2012-161851 A, JP 2008-142876 A, WO 2003/035334 A1, and JP 2005-131713 A described above specifies the format of a database system adequate for providing a plurality of types of services.

SUMMARY

This invention has an object to construct and provide a database system adequate for providing a plurality of types of services.

A control system according to one embodiment of the present invention disclosed in this application includes: a data acquisition apparatus group including at least one data acquisition apparatus capable of acquiring a position and an image of an object present in a space; and a control apparatus configured to control the data acquisition apparatus group to execute a plurality of different pieces of processing for one of the space and the object. The control apparatus includes: a processor configured to execute programs relating to the plurality of different pieces of processing; a storage device configured to store the programs; and a communication interface capable of communicating to and from the data acquisition apparatus group, in which the storage device is configured to store, when the processor executes any one of the plurality of different pieces of processing, as data on a first object, time series data on a series of pieces of information on the first object that has been collected since the at least one data acquisition apparatus detected the first object, and in which the processor is configured to execute, in each processing of the plurality of different pieces of processing: acquisition processing of acquiring, from the at least one data acquisition apparatus, as data on a second object, time series data on a series of pieces of information on the second object that has been collected since the at least one data acquisition apparatus detected the second object; determination processing of determining whether or not the first object and the second object are identical to each other based on information on the first object in the data on the first object stored in the storage device and information on the second object in the data on the second object acquired through the acquisition processing; and storage processing of storing, when the determination processing results in a determination that the first object and the second object are identical to each other, the data on the second object and the data on the first object into the storage device in association with each other, and when the determination processing results in a determination that the first object and the second object are not identical to each other, the data on the second object and the data on the first object into the storage device without associating the data on the second object with the data on the first object.

According to the representative embodiment of this invention, it is possible to identify when and where individual objects are present while enabling cooperation among the plurality of different pieces of processing.

DETAILED DESCRIPTION OF THE EMBODIMENT

<Usage Example of Control System>

Figure 1:
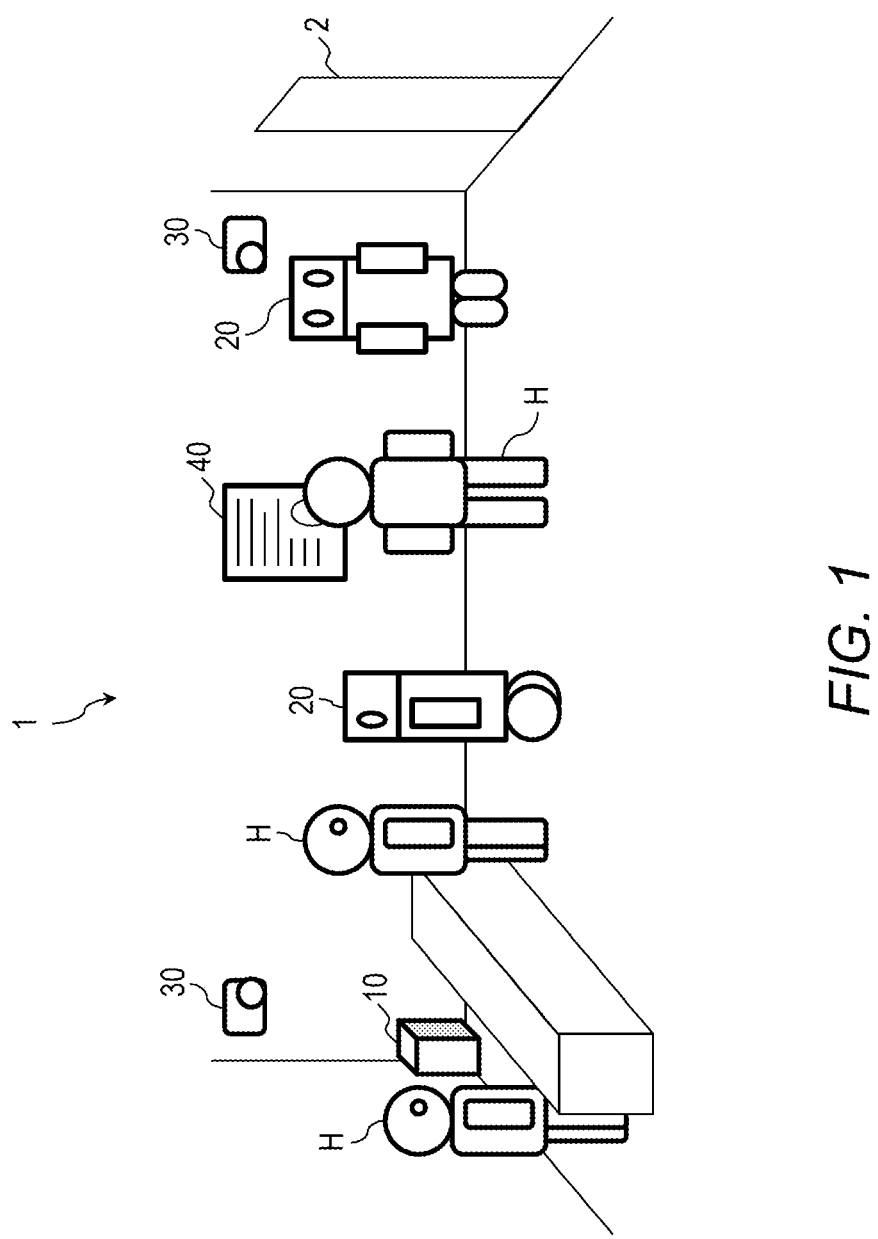
FIG. 1 is an explanatory diagram for illustrating a usage example of a control system according to an embodiment of this invention.

FIG. 1 is an explanatory diagram for illustrating a usage example of a control system according to an embodiment of this invention. A space 1 is a space, for example, a commercial facility, in which a person H enters or leaves from an entrance 2, and purchases goods or receives services. The space 1 is controlled by a control apparatus 10. The control apparatus 10 is configured to control data processing apparatus provided in the space 1. Each of the data processing apparatus is a movable data processing apparatus or a fixed data processing apparatus.

The movable data processing apparatus is a data processing apparatus that moves in the space 1. The movable data processing apparatus is, for example, a robot 20 configured to move autonomously and communicate to/from the control apparatus 10. The robot 20 is a data processing apparatus controlled by the control apparatus 10 to acquire voices and images in the space 1 for transmission to the control apparatus 10 or receive voices and images required for the person H from the control apparatus 10 for output. The robot 20 may travel with wheels or may walk or travel with a plurality of legs. Alternatively, the robot 20 may be a data processing apparatus that flies in the space 1 like a drone.

The fixed data processing apparatus is a data processing apparatus fixed in the space 1. The fixed data processing apparatus is, for example, a surroundings camera 30 or a digital signage 40. The surroundings camera 30 is a data processing apparatus controlled by the control apparatus 10 to acquire images in the space 1 for transmission to the control apparatus 10. The surroundings camera 30 is, for example, a 3D camera capable of measuring a distance to a subject. The digital signage 40 is a data processing apparatus controlled by the control apparatus 10 to receive voices and images required for humans from the control apparatus 10 for output.

Among the data processing apparatus, the robot 20 capable of acquiring images and voices and the surroundings camera 30 capable of acquiring images are referred to as "data acquisition apparatus". Further, among the data processing apparatus, the robot 20 and the digital signage 40 that are capable of outputting images and voices are referred to as "data output apparatus".

<Hardware Configuration Example of Control System>

Figure 2:
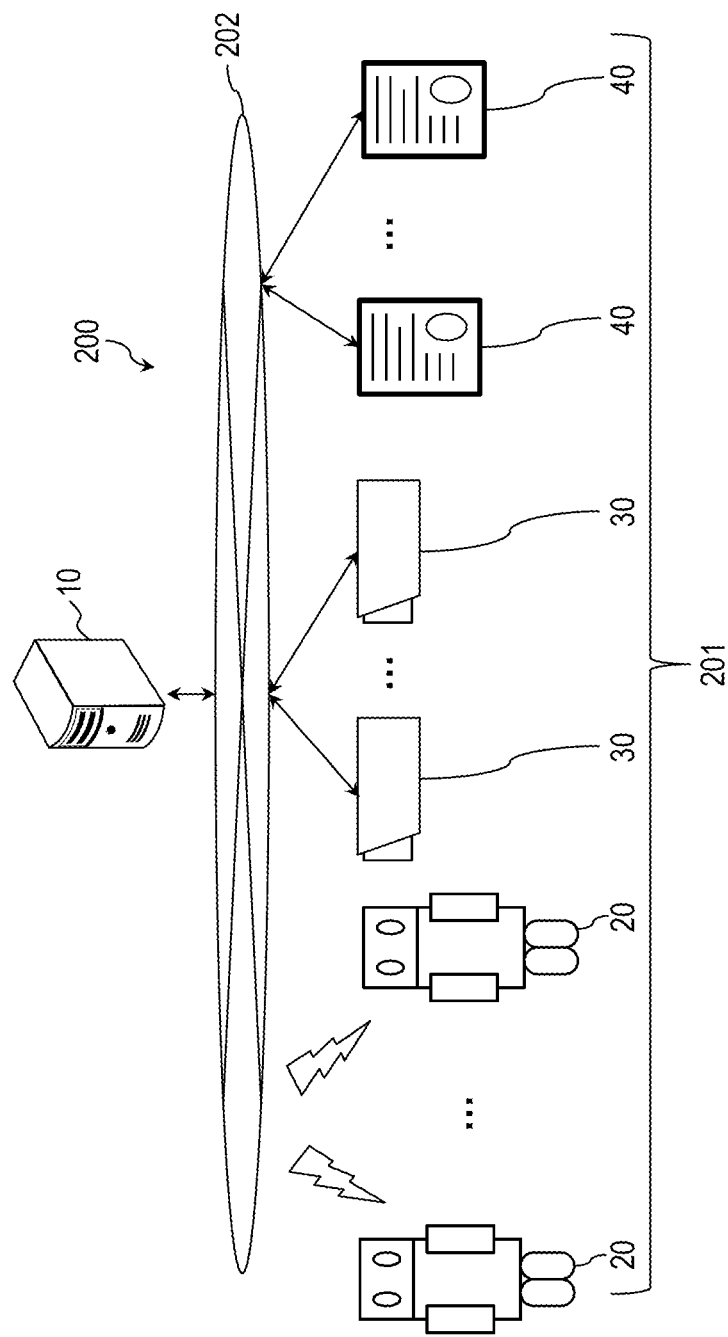
FIG. 2 is a block diagram for illustrating a hardware configuration example of the control system.

FIG. 2 is a block diagram for illustrating a hardware configuration example of the control system. A control system 200 is a system in which the control apparatus 10, a data processing apparatus group 201, and a lost item management system 1130 are coupled to one another for communication via a network 202 such as a local area network (LAN), a wide area network (WAN), or the Internet. The lost item management system 1130 is a system configured to manage lost item information such as an image of a lost item, a found date, a found place, and a finder.

<Hardware Configuration Example of Control Apparatus 10>

Figure 3:
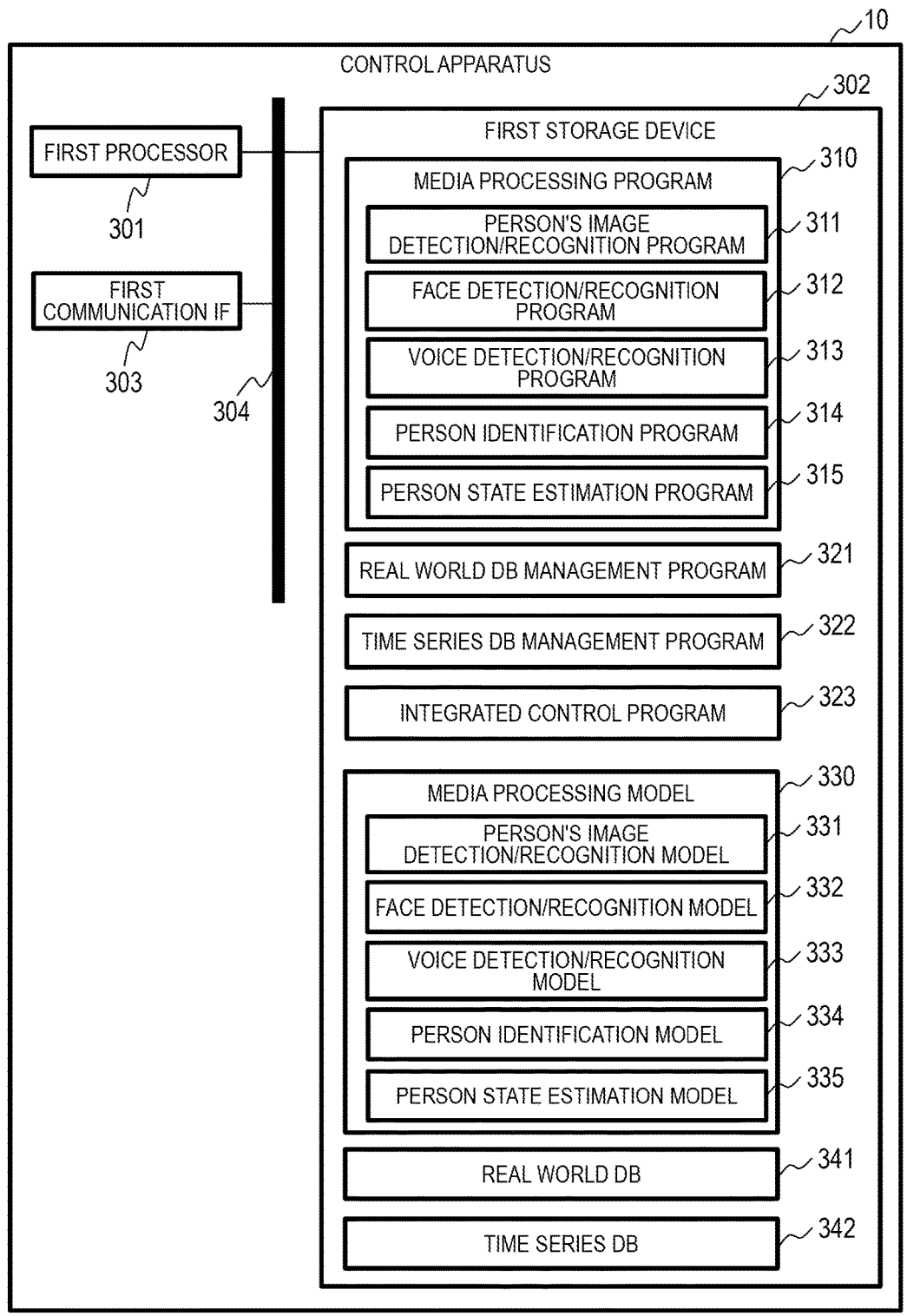
FIG. 3 is a block diagram for illustrating a hardware configuration example of the control apparatus.

FIG. 3 is a block diagram for illustrating a hardware configuration example of the control apparatus 10. The control apparatus 10 includes a first processor 301, a first storage device 302, a first communication interface (IF) 303, and a bus 304 configured to couple those components to one another. The first processor 301 is configured to control the control apparatus 10 using a part of the first storage device 302 as a work area. The first processor 301 executes a program stored in the first storage device 302, refers to a model stored in the first storage device 302, and reads or writes data from/to a real world DB 341 or a time series DB 342.

The first storage device 302 is, for example, a hard disk drive (HDD) or a flash memory. The first storage device 302 stores a media processing program 310, a real world DB management program 321, a time series DB management program 322, an integrated control program 323, a media processing model 330, the real world DB 341, and the time series DB 342.

The media processing program 310 is a program for executing media processing. The media processing is processing to be executed by various kinds of programs contained in the media processing program 310. The media processing program 310 contains a person's image detection/recognition program 311, a face detection/recognition program 312, a voice detection/recognition program 313, a person identification program 314, and a person state estimation program 315. The person's image detection/recognition program 311 is a program for referring to a person's image detection/recognition model 331, detecting a person's image, and recognizing what kind of person the detected person's image represents. The face detection/recognition program 312 is a program for referring to a face detection/recognition model 332, detecting a face, and recognizing what kind of face the detected face represents. The voice detection/recognition program 313 is a program for referring to a voice detection/recognition model 333, detecting a voice, and recognizing what kind of voice the detected voice represents. The person identification program 314 is a program for referring to a person identification model 334 and identifying a person. The person state estimation program 315 is a program for referring to a person state estimation model 335 and estimating a state of a person.

The real world DB management program 321 is a program for managing the real world DB 341. The time series DB management program 322 is a program for managing the time series DB 342. The integrated control program 323 is a program for referring to the real world DB 341 and the time series DB 342 and controlling the data processing apparatus. For example, the integrated control program 323 is a program for creating an operation instruction for the robot 20 and transmitting the instruction to the robot 20.

The media processing model 330 is a model to be used for media processing by the media processing program 310. The media processing model 330 contains the person's image detection/recognition model 331, the face detection/recognition model 332, the voice detection/recognition model 333, the person identification model 334, and the person state estimation model 335.

The person's image detection/recognition model 331 is data on various types of person's images (e.g., body shape and sex) serving as templates. The face detection/recognition model 332 is data on various types of faces (e.g., face shape, hairstyle, and sizes and shapes of eyes, ears, nose, and mouth) serving as templates. The voice detection/recognition model 333 is data on various types of voice models (e.g., phoneme corresponding to amplitude) and models on age or sex that correlate with voices, which serve as templates. A voice recognition result is obtained using the voice models, and a speaker recognition result is obtained using the models on age or sex.

The person identification model 334 is a model for identifying whether or not time series data on an in-space person's image area and time series data on an in-space voice area, which are identified in a certain space and in a certain time frame, represent the same person. Specifically, for example, the person identification model 334 is a combination of a threshold value of the time series data on an in-space person's image area and a threshold value of the time series data on an in-space voice area. When the time series data on an in-space person's image area and the time series data on an in-space voice area, which are identified in a certain space and in a certain time frame, exhibit the threshold values or more, respectively, the time series data on an in-space person's image area and the time series data on an in-space voice area are identified to be data for identifying one person.

The person state estimation model 335 is data on states (e.g., standing state and sitting state) of a person serving as templates.

The real world DB 341 is a database for managing the real world, namely, information on persons in the space 1, as indexes. Specifically, for example, the real world DB 341 stores, as indexes, images and voices input from the data processing apparatus, a person's image area, an in-space person's image area, a voice recognition result, and a speaker recognition result. The time series DB 342 is a database for managing time series data on the pieces of information managed as the indexes. Those DBs are described later with reference to FIG. 5.

<Hardware Configuration Example of Robot 20>

Figure 4:
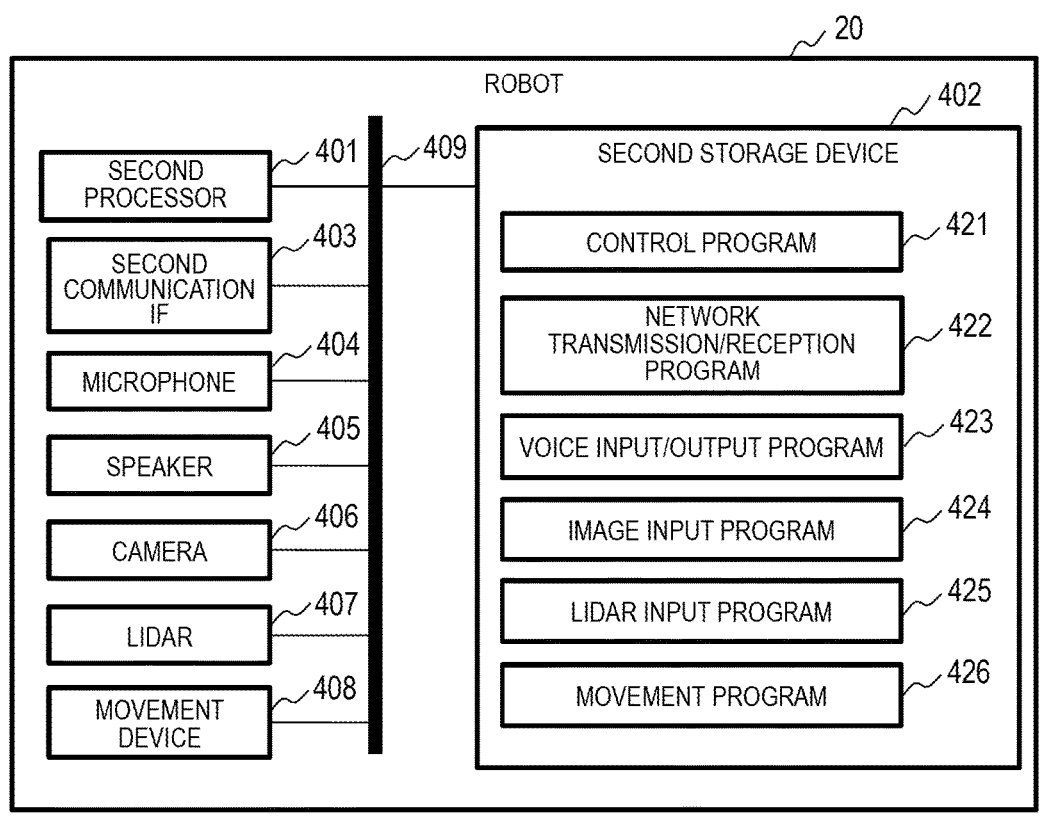
FIG. 4 is a block diagram for illustrating a hardware configuration example of the robot.

FIG. 4 is a block diagram for illustrating a hardware configuration example of the robot 20. The robot 20 includes a second processor 401, a second storage device 402, a second communication IF 403, a microphone 404, a speaker 405, a camera 406, a laser imaging detection and ranging (LIDAR) 407, a movement device 408, and a bus 409 configured to couple those components to one another. The second processor 401 is configured to control the robot 20 using a part of the second storage device 402 as a work area. The second processor 401 executes a program stored in the second storage device 402.

The second storage device 402 is, for example, a hard disk drive (HDD) or a flash memory. The second storage device 402 stores a control program 421, a network transmission/reception program 422, a voice input/output program 423, an image input program 424, a LIDAR input program 425, and a movement program 426.

The control program 421 is a program for controlling the robot 20 in cooperation with other programs in the second storage device 402 in accordance with an action instruction from the media processing program 310 of the control apparatus 10. Further, the control program 421 also functions as an artificial intelligence.

The network transmission/reception program 422 is a program for transmitting/receiving data to/from the control apparatus 10 in accordance with an instruction from the control program 421. For example, the network transmission/reception program 422 transmits input data such as voice data, image data, direction data, and distance data to the control apparatus 10 from the second communication IF 403 via the network 202. Further, the network transmission/reception program 422 receives an action instruction or output data from the control apparatus 10 from the network 202 via the second communication IF 403.

The voice input/output program 423 is a program for inputting voices in external surroundings with the microphone 404 for storage into the second storage device 402 as voice data in accordance with a voice input instruction from the media processing program 310 of the control apparatus 10, and outputting voices from the speaker 405 using voice data from the media processing program 310 of the control apparatus 10.

The image input program 424 is a program for photographing external surroundings with the camera 406 for input to the second storage device 402 as image data in accordance with a voice input instruction from the media processing program 310 of the control apparatus 10.

The LIDAR input program 425 is a program for inputting direction data for representing a direction of an object as viewed from the robot 20 and distance data for representing a distance between the object and the robot 20, which are acquired from the LIDAR 407.

The movement program 426 is a program for controlling driving of the movement device 408 and causing the robot 20 to move to a target position in accordance with an action instruction from the media processing program 310 of the control apparatus 10.

The second communication IF 403 is a device configured to transmit/receive data and instructions to/from the control apparatus 10. The second communication IF 403 receives data and instructions from the control apparatus 10 for storage into the second storage device 402. Further, the second communication IF 403 is controlled by the network transmission/reception program 422 to transmit to the control apparatus 10 data obtained through execution of various kinds of programs in the second storage device 402.

The microphone 404 is a device configured to input voices in external surroundings of the robot 20. The microphone 404 is controlled by the voice input/output program 423 to store voices into the second storage device 402. The microphone 404 may have, for example, an array shape, and can also detect the direction toward a sound source. The speaker 405 is a device configured to output voice data obtained from the control apparatus 10 to external surroundings. The speaker 405 is controlled by the voice input/output program 423 to output voices.

The camera 406 is a device configured to photograph the external surroundings of the robot 20. The camera 406 is controlled by the image input program 424 to store image data, which is obtained by photographing the external surroundings, into the second storage device 402.

The LIDAR 407 is a device configured to radiate an electromagnetic wave, for example, visible light, toward an obstacle and measure a reflective wave thereof, to thereby measure a distance to the obstacle in each direction on a measurement plane. In this embodiment, as an example, it is assumed that the measurement plane is parallel to a ground and a direction resolution is 1 degree.

The movement device 408 is a mechanism for moving the robot 20. The movement device 408 is, for example, a mechanism with wheels. Further, the movement device 408 may be a walking/running mechanism with a plurality of legs.

<Real World DB 341 and Time Series DB 342>

Figure 5:
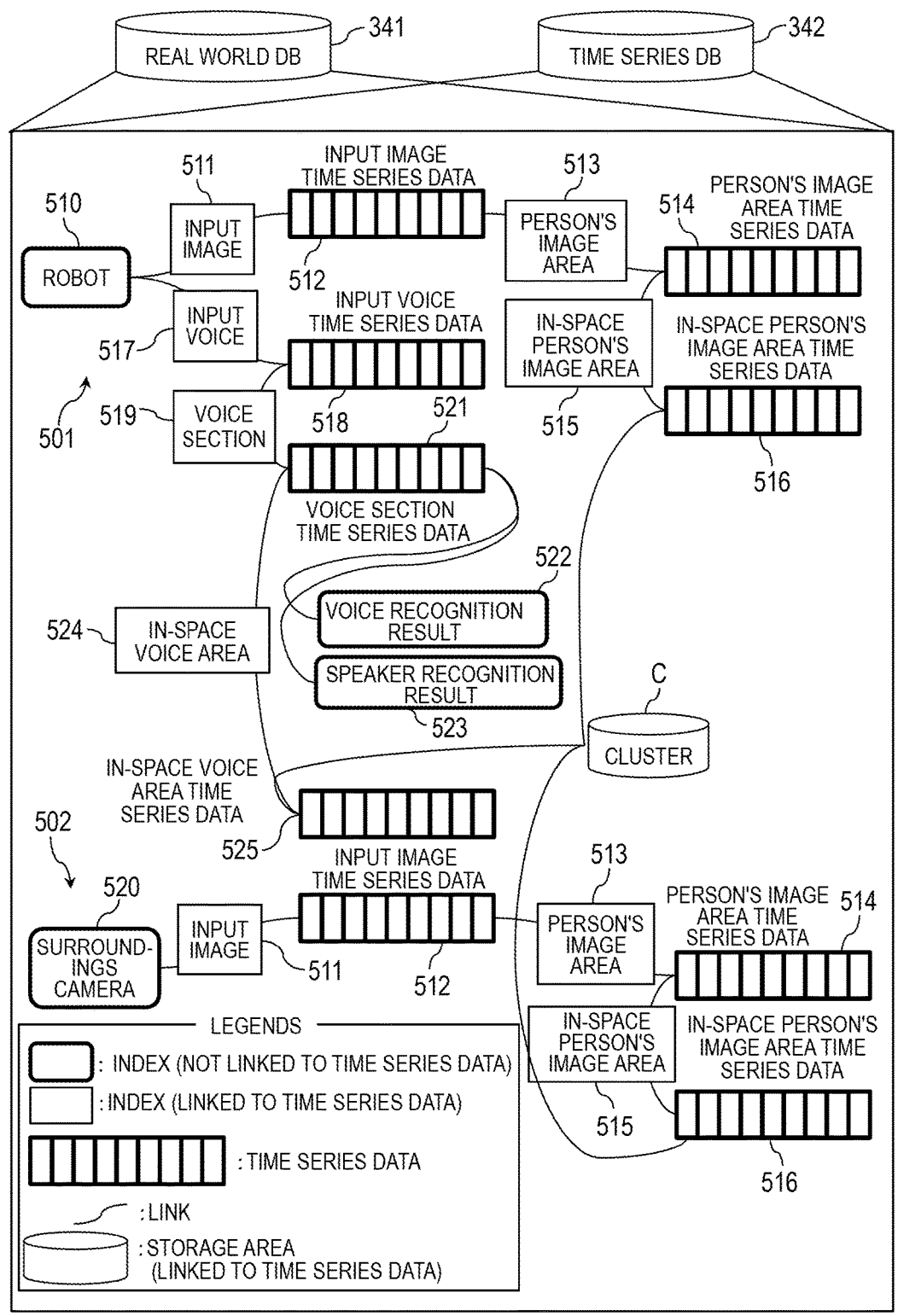
FIG. 5 is an explanatory diagram for illustrating an example of storage details of the real world DB and the time series DB.

FIG. 5 is an explanatory diagram for illustrating an example of storage details of the real world DB 341 and the time series DB 342. In order to describe a relation between indexes stored in the real world DB 341 and time series data stored in the time series DB 342, FIG. 5 is described by unifying the real world DB 341 and the time series DB 342 for the sake of description. The types of data to be stored are as shown by legends of FIG. 5. The indexes are stored in the real world DB 341, and time series data and clusters are stored in the time series DB 342. The clusters are obtained as a result of clustering time series data. Pieces of data to be stored into the real world DB 341 and the time series DB 342 form a tree structure for each type of the data processing apparatus.

A first tree 501 is tree structure data due to the robot 20, whereas a second tree 502 is tree structure data due to the surroundings camera 30. The first tree 501 has a robot index 510 as its root node, and has, as its intermediate nodes, an input image index 511, input image time series data 512, a person's image area index 513, person's image area time series data 514, an in-space person's image area index 515, in-space person's image area time series data 516, an input voice index 517, input voice time series data 518, a voice section index 519, voice section time series data 521, a voice recognition result index 522, a speaker recognition result index 523, an in-space voice area index 524, in-space voice area time series data 525, and a cluster C. The nodes are coupled to one another via links.

The robot index 510 is an index containing a robot ID for uniquely identifying the robot 20. The robot index 510 contains position data and direction data in a local coordinate system of the robot 20.

The input image index 511 is an index for identifying the input image time series data 512. The input image index 511 is generated when the input image time series data 512 is input from the robot 20, and is linked to sequentially input pieces of the input image time series data 512.

The input image time series data 512 is a series of chronologically input pieces of input image data. Individual pieces of input image data of the input image time series data 512 contain position data and direction data on an object (e.g., person), which exists in the local coordinate system of the robot 20 and is identified in the input image data as viewed from the robot 20.

The person's image area index 513 is an index for identifying the person's image area time series data 514. The person's image area index 513 is generated when the input image time series data 512 is input from the robot 20, and is linked to sequentially generated pieces of the person's image area time series data 514.

The person's image area time series data 514 is a series of chronologically generated pieces of person's image area data. The person's image area data is data on an area (e.g., rectangle) enclosing an image (person's image) of a person detected from the input image data of the same time. The person's image area data also contains position data and direction data of the input image data of the same time.

The in-space person's image area index 515 is an index for identifying the in-space person's image area time series data 516. The in-space person's image area index 515 is generated when the person's image area time series data 514 is generated, and is linked to sequentially generated pieces of the in-space person's image area time series data 516.

The in-space person's image area time series data 516 is a series of chronologically generated pieces of in-space person's image area data. The in-space person's image area data is person's image area data obtained by converting position data and direction data of the person's image area data of the same time into coordinates in a global coordinate system of the space 1.

The input voice index 517 is an index for identifying the input voice time series data 518. The input voice index 517 is generated when the input voice time series data 518 is input from the robot 20, and is linked to sequentially input pieces of the input voice time series data 518.

The input voice time series data 518 is a series of chronologically input pieces of input voice data. Individual pieces of input voice data of the input voice time series data 518 contain position data and direction data on an object (e.g., person H), which exists in the local coordinate system of the robot 20 and is identified in the input voice data as viewed from the robot 20.

The voice section index 519 is an index for identifying the voice section time series data 521. The voice section index 519 is generated when the input voice time series data 518 is input from the robot 20, and is linked to sequentially input pieces of the voice section time series data 521.

The voice section time series data 521 is a series of pieces of voice section data corresponding to pieces of the input voice time series data 518. The voice section data is data on a voice section of from when utterance of voice started until when the utterance of voice ended.

The voice recognition result index 522 is a node containing a voice recognition result relating to input voice data for each voice section. The voice recognition result is information detected and recognized by the voice detection/recognition program 313. The voice recognition result may be waveform data for each voice section, or may be character string data obtained by converting input voice data into text.

The speaker recognition result index 523 is a node containing a speaker recognition result relating to input voice data for each voice section. The speaker recognition result is information for identifying a speaker of a voice detected and recognized by the voice detection/recognition program 313. Specifically, for example, the speaker of the speaker recognition result is information that has combined input voice data in a certain time frame, which is identified by the voice section time series data 521, with position data and direction data in the time frame.

The in-space voice area index 524 is an index for identifying the in-space voice area time series data 525. The in-space voice area index 524 is generated when the voice section time series data 521 is generated, and is linked to sequentially generated pieces of the in-space voice area time series data 525.

The in-space voice area time series data 525 is a series of chronologically generated pieces of in-space voice area data. The in-space voice area data is voice area data obtained by converting position data and direction data of the corresponding voice section data into coordinates in the global coordinate system of the space 1.

The cluster C is a result of clustering the in-space person's image area time series data 516 and the in-space voice area time series data 525 for a certain time frame.

The second tree 502 has a surroundings camera index 520 as its root node, and has, as its intermediate nodes, the input image index 511, the input image time series data 512, the person's image area index 513, the person's image area time series data 514, the in-space person's image area index 515, the in-space person's image area time series data 516, and the cluster C. The nodes are coupled to one another via links. The surroundings camera index 520 is an index containing a surroundings camera ID for uniquely identifying the surroundings camera 30. The surroundings camera index 520 contains position data and direction data in a local coordinate system of the surroundings camera 30. Regarding each intermediate node, the same description as that of the first tree 501 holds true simply by replacing the "robot 20" with the "surroundings camera 30", and thus a description thereof is omitted here.

<Procedure Example of Processing by Media Processing Program 310>

Next, a description is given of a procedure example of processing to be executed by the media processing program 310.

Figure 6:
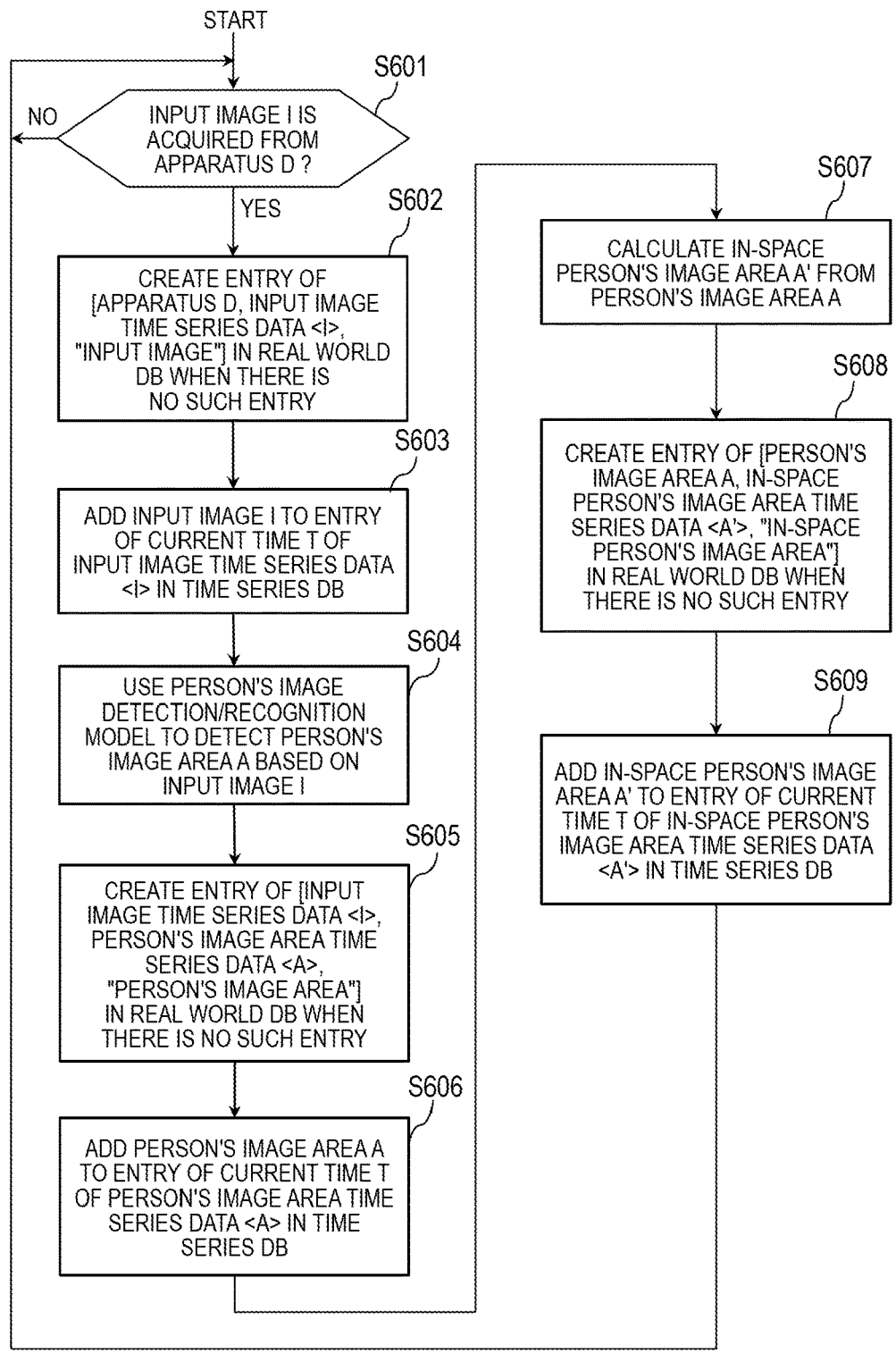
FIG. 6 is a flowchart for illustrating a procedure example of person's image detection/recognition processing to be executed by the person's image detection/recognition program.

FIG. 6 is a flowchart for illustrating a procedure example of person's image detection/recognition processing to be executed by the person's image detection/recognition program 311. The first processor 301 waits for input of an input image I from a data processing apparatus D (hereinafter referred to as "apparatus D") (Step S601: No), and when the first processor 301 acquires the input image I from the apparatus D (Step S601: Yes), the first processor 301 creates an entry of [apparatus D, input image time series data 512 <I>, "input image"] in the real world DB 341 when there is no such entry (Step S602). In other words, the first processor 301 creates the input image index 511 that links to the apparatus index serving as the root node. The apparatus index is the robot index 510 when the data processing apparatus is the robot 20, or the surroundings camera index 520 when the data processing apparatus is the surroundings camera 30.

Next, the first processor 301 adds the input image I to an entry of the current time T of the input image time series data 512 <I> in the time series DB 342 (Step S603). Then, the first processor 301 uses the person's image detection/recognition model 331 to detect a person's image area A that matches the person's image detection/recognition model 331 based on the input image I (Step S604).

Next, the first processor 301 creates an entry of [input image time series data 512 <I>, person's image area time series data 514 <A>, "person's image area"] in the real world DB 341 when there is no such entry (Step S605). In other words, the first processor 301 creates the person's image area index 513 that links to the input image time series data 512 <I>. Then, the first processor 301 adds the person's image area A detected in Step S604 to an entry of the current time T of the person's image area time series data 514 <A> in the time series DB 342 (Step S606).

Next, the first processor 301 calculates an in-space person's image area A' from the person's image area A (Step S607). Specifically, the position data and direction data of the person's image area A in the local coordinate system are converted into position data and direction data of the person's image area A in the global coordinate system. The position data and direction data of the person's image area A in the local coordinate system is determined based on the position data and direction data of the person in the local coordinate system of the apparatus D, and the distance and direction from the apparatus D to the person, which are acquired from the LIDAR 407.

Next, the first processor 301 creates an entry of [person's image area A, in-space person's image area time series data 516 <A'>, "in-space person's image area"] in the real world DB 341 when there is no such entry (Step S608). In other words, the first processor 301 creates the in-space person's image area index 515 that links to the person's image area time series data 514 <A>. Then, the first processor 301 adds the in-space person's image area A' calculated in Step S607 to an entry of the current time T of the in-space person's image area time series data 516 <A'> in the time series DB 342 (Step S608). Then, the processing returns to Step S601.

Figure 7:
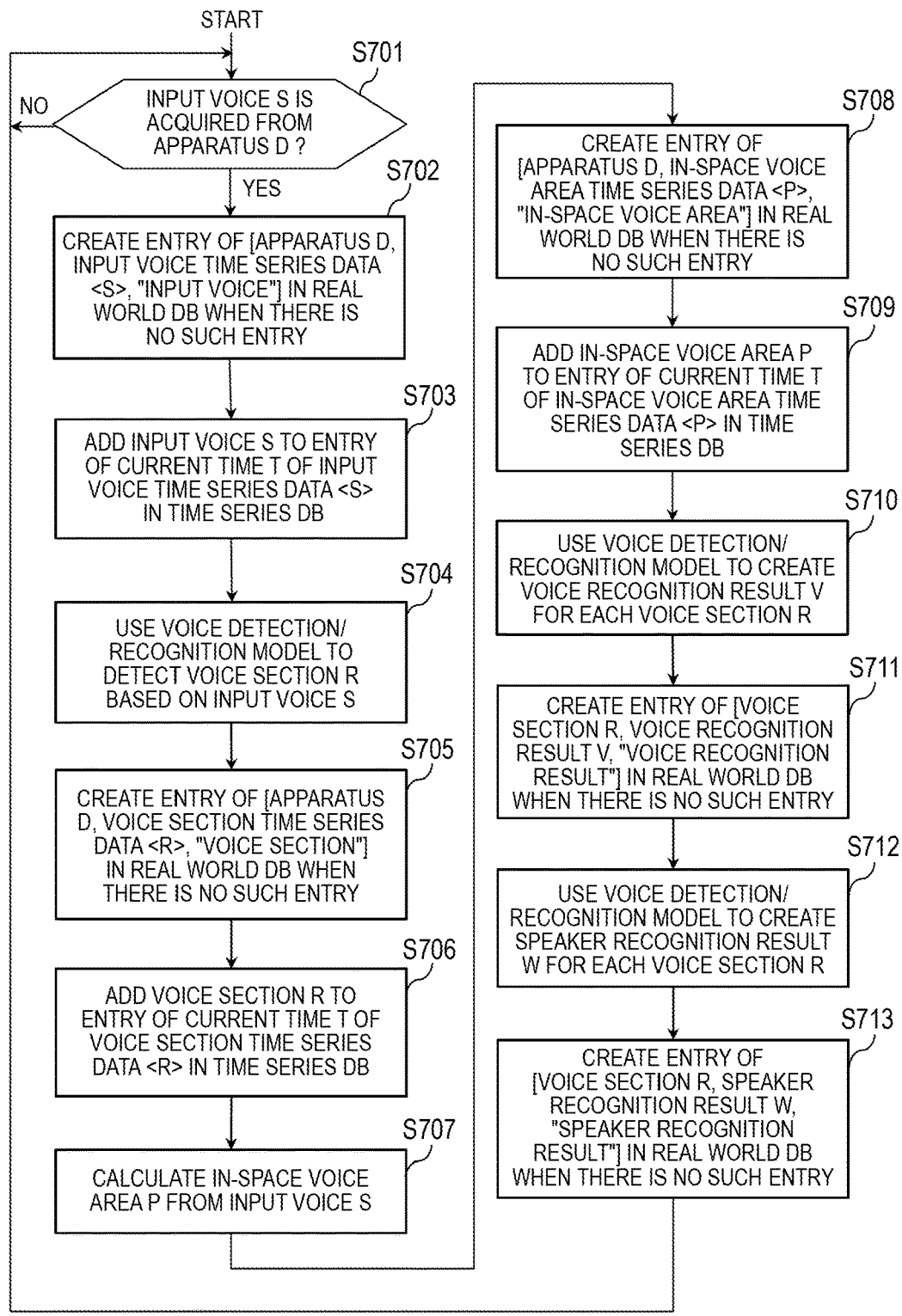
FIG. 7 is a flowchart for illustrating a procedure example of voice detection/recognition processing to be executed by the voice detection/recognition program.

FIG. 7 is a flowchart for illustrating a procedure example of voice detection/recognition processing to be executed by the voice detection/recognition program 313. The first processor 301 waits for input of an input voice S from the apparatus D (Step S701: No), and when the first processor 301 acquires the input voice S from the apparatus D (Step S701: Yes), the first processor 301 creates an entry of [apparatus D, input voice time series data 518 <S>, "input voice"] in the real world DB 341 when there is no such entry (Step S702). In other words, the first processor 301 creates the input voice index 517 that links to the apparatus index serving as the root node.

Next, the first processor 301 adds the input voice S to an entry of the current time T of the input voice time series data 518 <S> in the time series DB 342 (Step S703). Then, the first processor 301 uses the voice detection/recognition model 333 to detect a voice section R of a voice that matches the voice detection/recognition model 333 based on the input voice S (Step S704).

Next, the first processor 301 creates an entry of [apparatus D, voice section time series data 521 <R>, "voice section"] in the real world DB 341 when there is no such entry (Step S705). In other words, the first processor 301 creates the voice section index 519 that links to the voice section time series data 521 <R>. Then, the first processor 301 adds the voice section R detected in Step S704 to an entry of the current time T of the voice section time series data 521 <R> in the time series DB 342 (Step S706).

Next, the first processor 301 calculates an in-space voice area P from the voice section R based on the position data and direction data of the apparatus D (Step S707). Specifically, the first processor 301 converts the position data and direction data of the voice section R in the local coordinate system into position data and direction data of the voice section R in the global coordinate system. The position data and direction data of the voice section R in the local coordinate system is determined based on the position data and direction data of the person in the local coordinate system of the apparatus D, and the distance and direction from the apparatus D to the person, which are acquired from the LIDAR 407.

Next, the first processor 301 creates an entry of [apparatus D, in-space voice area time series data 525 <P>, "in-space voice area"] in the real world DB 341 when there is no such entry (Step S708). In other words, the first processor 301 creates the in-space voice area index 524 that links to the voice area time series data 525 <P>. Then, the first processor 301 adds the in-space voice area P calculated in Step S707 to an entry of the current time T of the in-space voice area time series data 525 <P> in the time series DB 342 (Step S709).

Next, the first processor 301 uses the voice detection/recognition model 333 to create, in the real world DB 341, a voice recognition result V that matches the voice detection/recognition model 333 for each voice section R (Step S710). Then, the first processor 301 creates an entry of [voice section R, voice recognition result V, "voice recognition result"] in the real world DB 341 when there is no such entry (Step S711). In other words, the first processor 301 creates the voice recognition result index 522 that links to the voice section time series data 521 <R>. Then, the first processor 301 associates the voice recognition result V for each voice section R created in Step S710 with the voice recognition result index 522.

Similarly, the first processor 301 uses the voice detection/recognition model 333 to create, in the real world DB 341, a speaker recognition result W that matches the voice detection/recognition model 333 for each voice section R (Step S712). Then, the first processor 301 creates an entry of [voice section R, speaker recognition result W, "speaker recognition result"] in the real world DB 341 when there is no such entry (Step S713). In other words, the first processor 301 creates the speaker recognition result index 523 that links to the voice section time series data 521 <R>. Then, the first processor 301 associates the speaker recognition result W for each voice section R created in Step S712 with the voice recognition result index 522. Then, the processing returns to Step S701.

Figure 8:
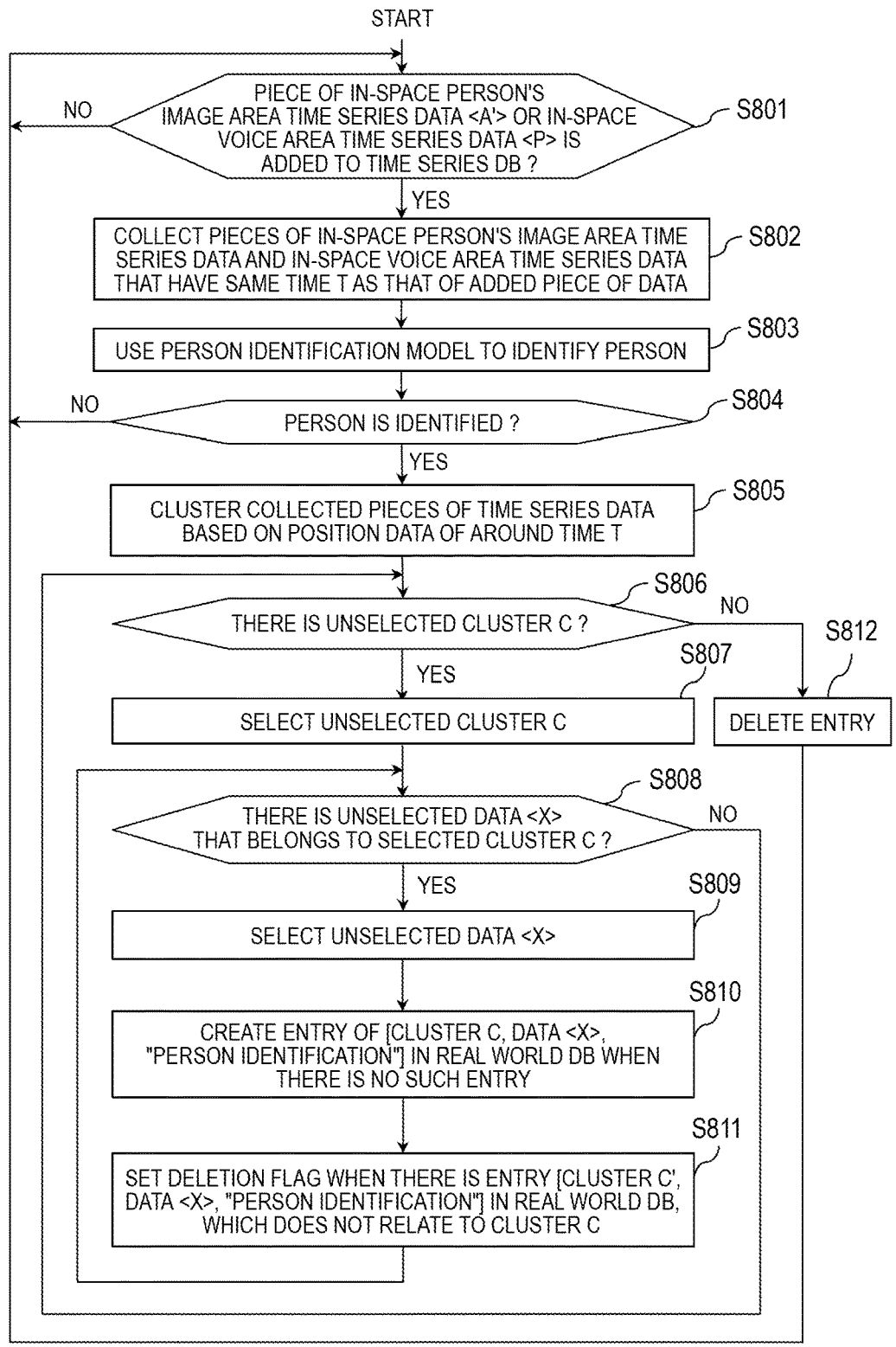
FIG. 8 is a flowchart for illustrating a procedure example of person identification processing to be executed by the person identification program.

FIG. 8 is a flowchart for illustrating a procedure example of person identification processing to be executed by the person identification program 314. First, the first processor 301 waits for a piece of the in-space person's image area time series data 516 <A'> or the in-space voice area time series data 525 <P> to be added to the time series DB 342 (Step S801: No). When the data is added (Step S801: Yes), the first processor 301 collects pieces of the in-space person's image area time series data 516 and the in-space voice area time series data 525 that have the same time T as that of the added piece of data (Step S802). Then, the first processor 301 uses the person identification model 334 to identify the person with the collected pieces of time series data (Step S803). When the person is not identified (Step S804: No), the processing returns to Step S801. When the person is identified (Step S804: Yes), the first processor 301 clusters the collected pieces of time series data based on the position data of around the time T (Step S805). As a result, clusters are generated for the collected pieces of time series data at a certain position in a certain time frame.

Next, the first processor 301 executes Steps S806 to S812 to delete time series data on another person in the clusters. Specifically, for example, the first processor 301 determines whether or not there is an unselected cluster C among a group of clusters generated in Step S805 (Step S806). When there is an unselected cluster C (Step S806: Yes), the first processor 301 selects one unselected cluster C (Step S807). Then, the first processor 301 determines whether or not there is unselected data <X> that belongs to the selected cluster C (Step S808). The data <X> is a piece of data at a certain time among pieces of time series data in the selected cluster C.

When there is unselected data <X> (Step S808: Yes), the first processor 301 selects unselected data <X> (Step S809). Then, the first processor 301 creates an entry of [cluster C, data <X>, "person identification"] in the real world DB 341 when there is no such entry. In other words, the first processor 301 creates a person identification index when the index is not created yet, and associates the selected data <X> and the person identification index with the cluster C. When the person identification index is already created, the first processor 301 associates the selected data <X> with the person identification index of the selected cluster C.

Then, when there is an entry [cluster C', data <X>, "person identification"] in the real world DB 341, which does not relate to the selected cluster C, the first processor 301 sets a deletion flag in the entry (Step S811) and the processing returns to Step S808. In Step S808, when there is no unselected data <X> (Step S808: No), the processing returns to Step S806. In Step S806, when there is no unselected cluster C (Step S806: No), the first processor 301 deletes entries whose deletion flags are set for each of the group of clusters (Step S812), and the processing returns to Step S801. As a result, each cluster represents data on one person identified from the collected pieces of time series data at a certain position in a certain time frame.

Although the processing to be executed by the face detection/recognition program 312 is not illustrated, the point is that the first processor 301 uses the face detection/recognition model 332 to detect a face based on the person's image area A detected in Step S604 of FIG. 6, and recognizes what kind of face the detected face represents. The face recognition result is stored in the person's image area A. Further, although the processing to be executed by the person state estimation program 315 is not illustrated, the point is that the first processor 301 uses the person state estimation model 335 to estimate, based on the person's image area A detected in Step S604 of FIG. 6, the state of a person in the person's image area A. The person state estimation result is stored in the person's image area A.

<Operation Example of Control System 200>

Figure 9:
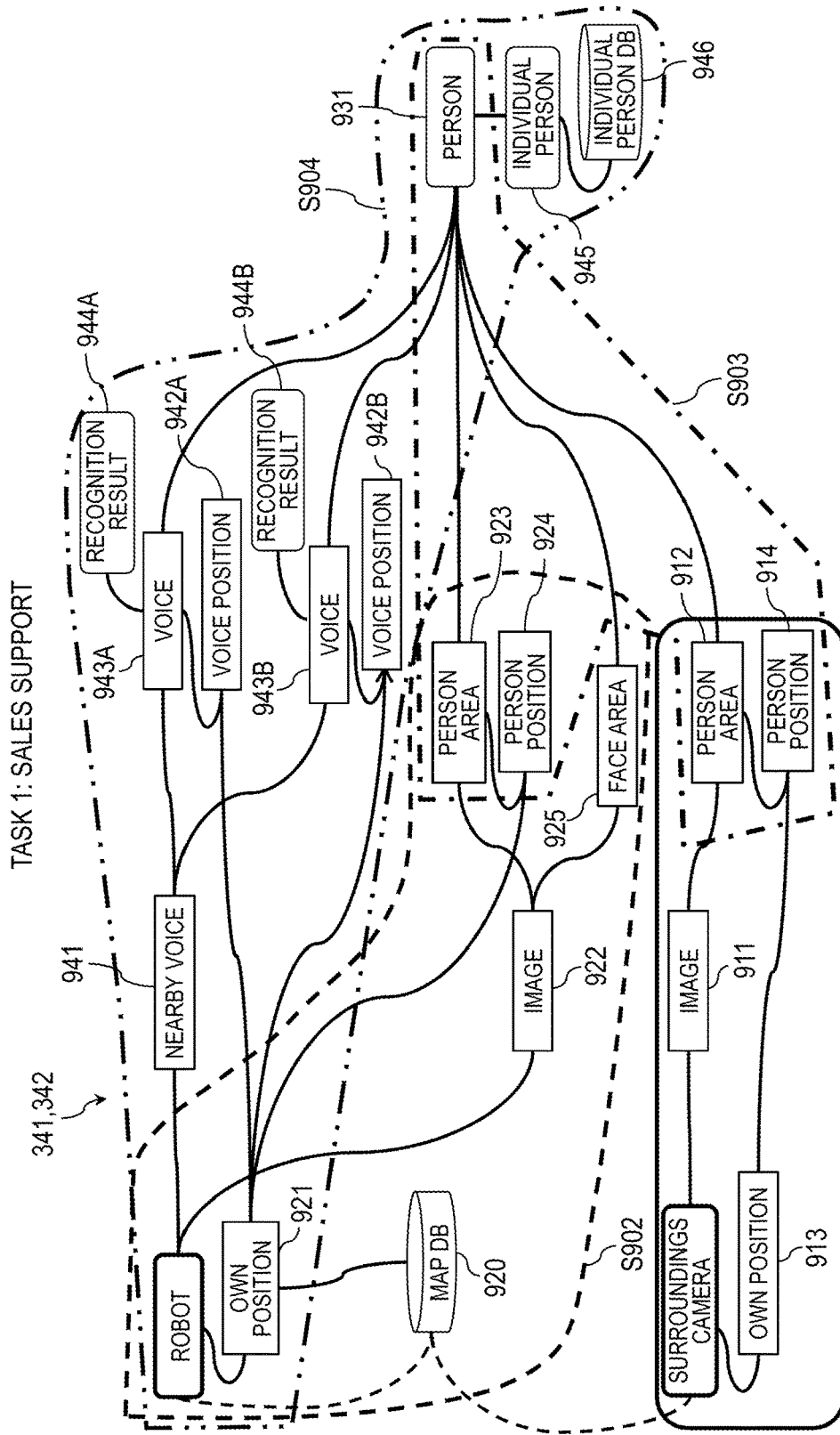
FIG. 9 is an explanatory diagram for illustrating an update example of the real world DB and the time series DB in sales support.
Figure 10:
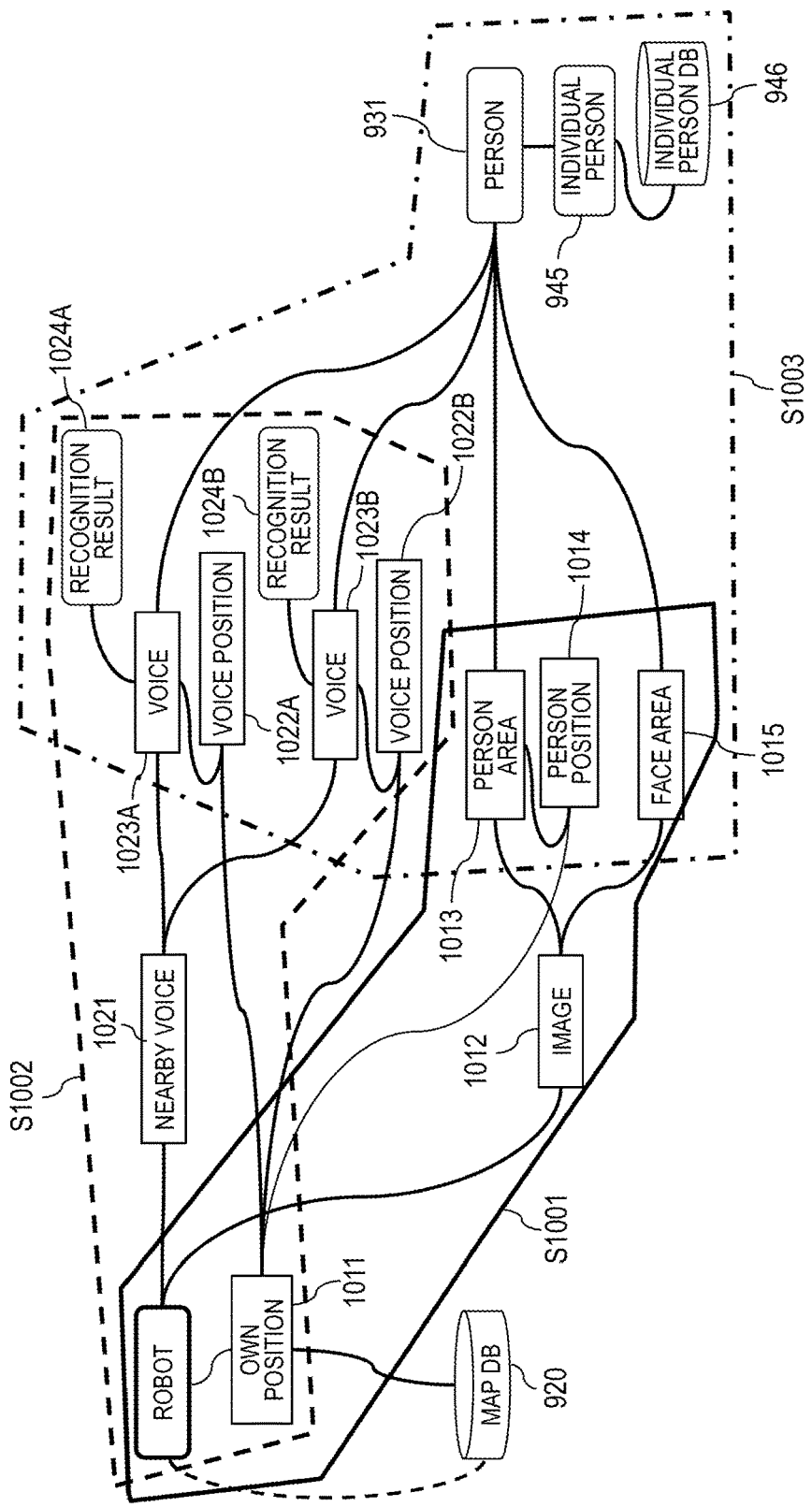
FIG. 10 is an explanatory diagram for illustrating an update example of the real world DB and the time series DB in guidance.
Figure 11:
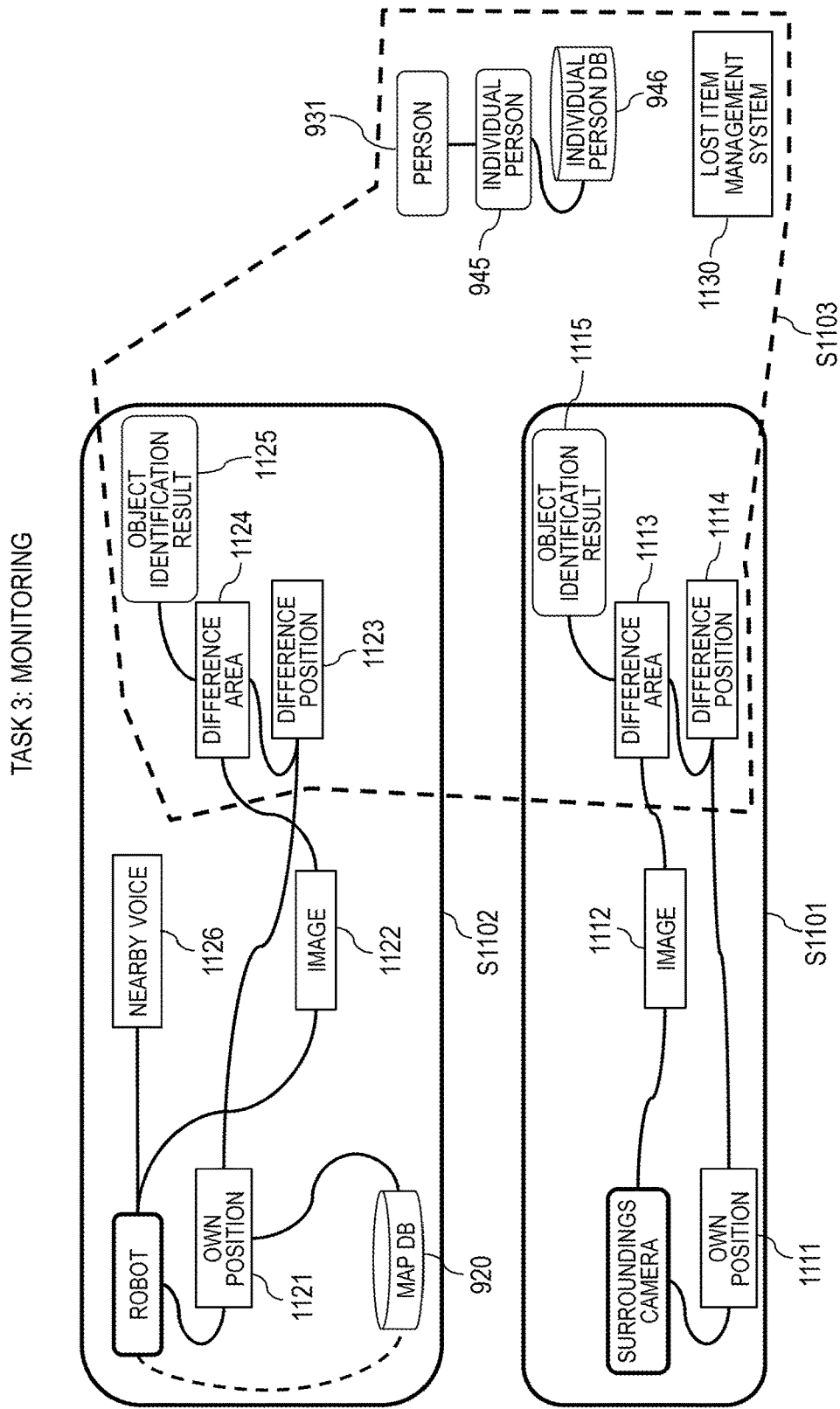
FIG. 11 is an explanatory diagram for illustrating an update example of the real world DB and the time series DB in monitoring.

Next, a description is given of an operation example of the control system 200 with reference to FIG. 9 to FIG. 11. In FIG. 9 to FIG. 11, the control system 200 executes three tasks, namely, sales support (FIG. 9), guidance (FIG. 10), and monitoring (FIG. 11) while referring to and updating the real world DB 341 and the time series DB 342. The sales support is processing to be executed by the control apparatus 10, which involves causing the robot 20 to execute processing of approaching a person and recommending a product in the space 1. The guidance is processing to be executed by the control apparatus 10, which involves causing the robot 20 to execute processing of providing information depending on a request from a person when the person has approached the robot 20 in the space 1. The digital signage 40 may execute the processing instead of the robot 20. The monitoring is processing to be executed by the control apparatus 10, which causes the robot 20 to monitor a suspicious person in the space 1. The surroundings camera 30 may execute the processing instead of the robot 20.

Those three tasks are executed by the integrated control program 323. In this example, it is assumed that the sales support (FIG. 9), the guidance (FIG. 10), and the monitoring (FIG. 11) are executed in parallel simultaneously. However, for example, the sales support (FIG. 9), the guidance (FIG. 10), and the monitoring (FIG. 11) may be executed sequentially in the stated order. FIG. 9 to FIG. 11 are exemplary illustrations of specific storage details of the real world DB 341 and the time series DB 342 illustrated in FIG. 5, and the indexes and time series data are denoted in a simplified manner. Although a description is given below of processing using the robot 20 and the surroundings camera 30 as operation subjects for the sake of convenience in FIG. 9 to FIG. 11, in fact, the control apparatus 10 causes the robot 20 and the surroundings camera 30 to execute the processing.

<Sales Support>

FIG. 9 is an explanatory diagram for illustrating an update example of the real world DB 341 and the time series DB 342 in sales support. In Step S901, the surroundings camera 30 photographs the person H to acquire an image 911, and detects a person area 912 containing a person image from the acquired image 911. Further, the surroundings camera 30 measures the distance and direction from the surroundings camera 30 to the person H. The control apparatus 10 refers to a map DB 920 to calculate a person position 914, which is a position of the person area 912, based on an own position 913 held by the surroundings camera 30 in advance and the measured distance and direction. The map DB 920 stores map data on the space 1 that is based on the global coordinate system. The person position 914 is position data obtained through conversion into coordinates in the global coordinate system of the space 1.

Step S902 is executed when, in Step S901, each position data of the time series data in a certain time frame, which is the person position 914, falls within an allowable range. In Step S902, the robot 20 moves and approaches the person position 914 identified by the surroundings camera 30. At this time, the robot 20 moves while updating an own position 921 in the global coordinate system of the space 1 by scan matching using, for example, a laser range finder (LRF) and the map DB 920. The robot 20 photographs the person H present in the person position 914 with the camera 406 to acquire an image 922, and detects a person area 923 containing a person image from the acquired image 922. Further, the robot 20 measures the distance and direction from the camera 406 to the person H with the LIDAR 407, refers to the map DB 920, and calculates a person position 924, which is the position of the person area 923, based on the current own position 921 of the robot 20 and the measured distance and direction. The person position 924 is position data obtained through conversion into coordinates in the global coordinate system of the space 1. Further, the robot 20 recognizes a face area 925 from the image 922.

Step S903 is executed after completion of Step S902. In Step S903, the control apparatus 10 determines whether or not time series data on the person position 914 identified in Step S901 and time series data on the person position 924 identified in Step S902 are similar to each other in the same time frame. The similarity is determined based on, for example, a Euclidean distance between those pieces of time series data. For example, when the Euclidean distance is equal to or smaller than a threshold value, those pieces of time series data are similar to each other. In such a case, the persons H present in the person position 914 and the person position 924 in the same time frame are the same person H, and the control apparatus 10 stores the person H as a person 931. The person 931 is linked to the person areas 912 and 923 and the face area 925. As a result, the person H present in a certain time frame and his or her face are identified.

Step S904 is executed after completion of Step S903. In Step S904, the robot 20 is located near the person 931 (person H identified therefrom). The robot 20 detects nearby voices 941 with the microphone 404, and calculates voice positions 942A and 942B, which are positions where voices were uttered, based on the directions from the sound sources detected by the microphone 404 and the current own position 921. The voice positions 942A and 942B are position data obtained through conversion into coordinates in the global coordinate system of the space 1.

Further, the robot 20 determines whether or not time series data on the person position 924 identified in Step S902 and time series data on the voice position 942A are similar to each other in the same time frame. The similarity is determined based on, for example, a Euclidean distance between those pieces of time series data. For example, when the Euclidean distance is equal to or smaller than a threshold value, those pieces of time series data are similar to each other. In such a case, the persons H present in the person position 924 and the voice position 942A in the same time frame are the same person H. Therefore, the robot 20 acquires a recognition result 944A of a voice 943A uttered at the voice position 942A among the nearby voices 941, and associates the voice 943A with the person 931. Then, the control apparatus 10 stores those pieces of data associated with the person 931 into an individual person DB 946 having, as its index, an individual person 945 serving as an identifier for uniquely identifying the person H. The voice position 942B is processed in the same manner. Specifically, the robot 20 acquires a voice 943B and a recognition result 944B, and associates the voice 943B with the person 931. Then, the control apparatus 10 stores those pieces of data associated with the person 931 into the individual person DB 946 having the individual person 945 as its index.

In Step S904, it is assumed that the voice positions 942A and 942B are the voice positions for the same person 931. However, the plurality of persons H may have a conversation near the robot 20. For example, when a person Ha moves toward a cash desk, the person Ha, who is a customer, may have a conversation with a person Hb, who is a clerk. The person 931 is identified for each of the persons Ha and Hb. Therefore, for example, the control apparatus 10 associates the voice position 942A, the voice 943A, and the recognition result 944A (e.g., "I would like to try on the product X") with the person 931 of the person Ha, and stores the recognition result 944A into the individual person DB 946 having, as its index, the individual person 945 serving as an identifier for uniquely identifying the person Ha. Similarly, the control apparatus 10 associates the voice position 942B, the voice 943B, and the recognition result 944B (e.g., "The fitting room is over there") with the person 931 of the person Hb, and stores the recognition result 944B into the individual person DB 946 having, as its index, the individual person 945 serving as an identifier for uniquely identifying the person Hb.

Further, the control apparatus 10 may communicate to/from a mobile terminal (not shown) of the person Hb, who is a clerk. For example, in this case, time series data on the voice position 942A of the person Ha, who is a customer, and time series data on the voice position 942B of the person Hb, who is a clerk, are similar to each other in the same time frame. Therefore, the control apparatus 10 identifies the person Ha to be a conversation partner of the person Hb, and transfers respective pieces of data of the persons Ha and Hb in the individual person DB 946 to the mobile terminal of the person Hb. As a result, the person Hb, who is a clerk, can check when, where, and with whom the person Hb had a conversation, and details of the conversation. Further, the person Hb can refer to the data on the person Ha in the individual person DB 946, and thus can also check a chronological movement trajectory of the person Ha in the space 1. Therefore, the person Hb can recognize the taste of the person Ha and take advantage of the knowledge for sales.

Further, the person Hb may input personal information on the person Ha into a mobile terminal and update the individual person DB 946. With this, after the input, the control apparatus 10 can recognize what kind of person H the person Ha identified by the individual person DB 946 is.

<Guidance>

FIG. 10 is an explanatory diagram for illustrating an update example of the real world DB 341 and the time series DB 342 in guidance. The same data as that of FIG. 9 is denoted by the same reference symbol, and a description thereof is omitted here. In sales support, the robot 20 approaches the person H. However, in guidance, the robot 20 detects the person H approaching the robot 20 and guides the person H.

In Step S1001, the robot 20 detects an approaching object with the LIDAR 407. The robot 20 moves while updating an own position 1011 in the global coordinate system of the space 1 by scan matching using, for example, an LRF and the map DB 920. The robot 20 photographs an approaching object with the camera 406 to acquire an image 1012, and detects a person area 1013 containing a person image from the acquired image 1012. Further, the robot 20 measures the distance and direction from the camera 406 to the person H with the LIDAR 407. The control apparatus 10 refers to the map DB 920, and calculates a person position 1014, which is the position of the person area 1013, based on the current own position 1011 of the robot 20 and the measured distance and direction. The person position 1014 is position data obtained through conversion into coordinates in the global coordinate system of the space 1. Further, the robot 20 recognizes a face area 1015 from the image 1012.

Step S1002 is executed when, in Step S1001, each position data of the time series data in a certain time frame, which is the person position 1014, falls within an allowable range. In Step S1002, the robot 20 detects nearby voices 1021 with the microphone 404, and calculates voice positions 1022A and 1022B, which are positions where voices were uttered, based on the directions from the sound sources detected by the microphone 404 and the current own position 1011. The voice positions 1022A and 1022B are position data obtained through conversion into coordinates in the global coordinate system of the space 1.

Further, the robot 20 determines whether or not time series data on the person position 1014 identified in Step S1001 and time series data on the voice position 1022A are similar to each other in the same time frame. The similarity is determined based on, for example, a Euclidean distance between those pieces of time series data. For example, when the Euclidean distance is equal to or smaller than a threshold value, those pieces of time series data are similar to each other. In such a case, the persons H present in the person position 1014 and the voice position 1022A in the same time frame are the same person H. Therefore, the robot 20 acquires a recognition result 1024A of a voice 1023A uttered at the voice position 1022A among the nearby voices 1021, and associates the voice 1023A with the person 931. Then, the control apparatus 10 stores those pieces of data associated with the person 931 into the individual person DB 946 having, as its index, the individual person 945 serving as an identifier for uniquely identifying the person H. The voice position 1022B is processed in the same manner. Specifically, the robot 20 acquires a voice 1023B and a recognition result 1024B, and associates the voice 1023B with the person 931. Then, the control apparatus 10 stores those pieces of data associated with the person 931 into the individual person DB 946 having the individual person 945 as its index.

Step S1003 is executed after completion of Step S1002. The robot 20 determines whether or not time series data on the person position 1014 identified in Step S1001 and time series data on the voice position 1022A are similar to each other in the same time frame. The similarity is determined based on, for example, a Euclidean distance between those pieces of time series data. For example, when the Euclidean distance is equal to or smaller than a threshold value, those pieces of time series data are similar to each other. In such a case, the persons H present in the person position 1014 and the voice position 1022A in the same time frame are the same person H. Therefore, the robot 20 acquires the recognition result 1024A of the voice 1023A uttered at the voice position 1022A among the nearby voices 1021, and associates the voice 1023A with the person 931. Then, the control apparatus 10 stores those pieces of data associated with the person 931 into the individual person DB 946 having, as its index, the individual person 945. The voice position 1022B is processed in the same manner. Specifically, the robot 20 acquires the voice 1023B and the recognition result 1024B, and associates the voice 1023B with the person 931. Then, the control apparatus 10 stores those pieces of data associated with the person 931 into the individual person DB 946 having the individual person 945 as its index.

In this case, the person H identified by the person 931 approaches and has a conversation with the robot 20, and thus the recognition results 1024A and 1024B of the voices 1023A and 1023B are determined as the voice uttered by the person H. When the person H approaches the robot 20 and enters a predetermined range of distance from the own position 1011, the robot 20 utters "May I help you?". For example, when the recognition result 1024A of the voice 1023A is "Where is ww?", the robot 20 utters "Shall I take you to ww if you don't mind?". When the recognition result 1024B of the next voice 1023B is "Please", the robot 20 utters "Then, please follow me".

Further, during movement, the robot 20 may use data on the identified person 931 in the individual person DB 946 among a group of pieces of data in the individual person DB 946 to provide a conversation or information that suits the taste of the person 931. For example, the robot 20 may refer to the recognition results 944A and 944B in the individual person DB 946, identify a keyword, extract a subject corresponding to the identified keyword from a chat DB (not shown) for associating keywords with subjects, and have a conversation with the person H on the subject. The chat DB may be stored in the robot 20, or stored in the control apparatus 10. Alternatively, the robot 20 may search the network 202 for a corresponding subject.

<Monitoring>

FIG. 11 is an explanatory diagram for illustrating an update example of the real world DB 341 and the time series DB 342 in monitoring. The same data as those of FIG. 9 and FIG. 10 is denoted by the same reference symbol, and a description thereof is omitted here. In monitoring, the robot 20 or the surroundings camera 30 monitors the space 1.

In Step S1101, the surroundings camera 30 photographs the external surroundings at an own position 1111 to acquire an image 1112. The control apparatus 10 detects a difference area 1113, which is taken between the image 1112 and an image picked up at the same position in the past. Further, the surroundings camera 30 measures the distance and direction from the own position 1111 to the difference area 1113. The control apparatus 10 refers to the map DB 920 to calculate a difference position 1114, which is a position of the difference area 1113, based on the own position 1111 held by the surroundings camera 30 in advance and the measured distance and direction. The map DB 920 stores map data on the space 1 that is based on the global coordinate system. The difference position 1114 is position data obtained through conversion into coordinates in the global coordinate system of the space 1. Then, the control apparatus 10 recognizes an object in the difference area 1113, and outputs the object as an object identification result 1115.

Step S1102 is executed in parallel to Step S1101 simultaneously. In Step S1102, the robot 20 is patrolling the space 1, and is moving while updating an own position 1121 in the global coordinate system of the space 1 by scan matching using, for example, a laser range finder (LRF) and the map DB 920. The robot 20 photographs the external surroundings at the own position 1121 to acquire an image 1122. The control apparatus 10 detects a difference area 1123, which is taken between the image 1122 and an image picked up at the same position in the past. Further, the robot 20 measures the distance and direction from the current own position 1121 to the difference area 1123. The control apparatus 10 refers to the map DB 920 to calculate a difference position 1124, which is a position of the difference area 1123, based on the current own position 1121 and the measured distance and direction. The map DB 920 stores map data on the space 1 that is based on the global coordinate system. The difference position 1124 is position data obtained through conversion into coordinates in the global coordinate system of the space 1. Then, the control apparatus 10 recognizes an object in the difference area 1123, and outputs the object as an object identification result 1125.

Step S1103 is processing of using the object identification result 1115 of Step S1101 and the object identification result 1125 of Step S1102 for collation with data accumulated in the past. For example, the control apparatus 10 refers to the individual person DB 946, and detects presence of the person H identified by the person 931 corresponding to the object identification result 1115 or the object identification result 1125 when there is such corresponding person 931. Further, the control apparatus 10 accesses the lost item management system 1130, which is coupled to the control apparatus 10 for communication, and determines that the object identification result 1115 or the object identification result 1125 is a lost item when there is an image of a lost item corresponding to the object identification result 1115 or the object identification result 1125.

As described above, the control apparatus 10 in this embodiment controls a data acquisition apparatus group (robots 20 and surroundings camera 30) capable of acquiring positions and images of objects (e.g., persons and items) present in the space 1, and executes, for example, the above-mentioned three tasks, namely, sales support (FIG. 9), guidance (FIG. 10), and monitoring (FIG. 11) as a plurality of different pieces of processing in the space 1 or for objects.

When the first processor 301 executes any one of the plurality of different pieces of processing, the first storage device 302 stores time series data on a series of positions and images of a first object (e.g., person Ha) that has been collected since a data acquisition apparatus detected the first object, as data (e.g., data on person Ha in individual person DB 946) on the first object. The first processor 301 executes acquisition processing, determination processing, and storage processing in each of the plurality of different pieces of processing.

The acquisition processing is processing to be executed by the first processor 301, which involves acquiring from a data acquisition apparatus time series data on a series of pieces of information (e.g., positions and images) on a second object (certain person Ha) that has been collected since the data acquisition apparatus detected the second object, as data on the second object. The acquisition processing corresponds to, for example, the person's image detection/recognition program 311.

The determination processing is processing to be executed by the first processor 301, which involves determining whether or not the first object and the second object are identical to each other based on the information (e.g., image of first object) on the first object in the data on the first object stored in the first storage device 302 and the information (e.g., image of second object in data on second object) on the second object acquired through the acquisition processing. The determination processing corresponds to, for example, the person identification program 314.

The storage processing is processing of storing the data on the second object and the data on the first object into the first storage device 302 (real world DB 341 and time series DB 342) in association with each other when the determination processing results in a determination that the first object and the second object are identical to each other, or storing the data on the second object and the data on the first object into the first storage device 302 without associating those pieces of data with each other when the determination processing results in a determination that the first object and the second object are not identical to each other.

With this, it is possible to associate the data on the first object acquired through any one of the plurality of different pieces of processing (e.g., sales support) with the data on the second object acquired through other processing of the plurality of different pieces of processing (e.g., guidance). As a result, it is possible to identify when and where individual objects are present while enabling cooperation among the plurality of different pieces of processing.

Further, when the first processor 301 executes any one of the plurality of different pieces of processing, the first storage device 302 stores time series data on a series of positions, images, and voices of a third object that has been collected since a specific data acquisition apparatus (robot 20) detected the third object, as data on the third object. In this case, the first processor 301 executes acquisition processing, determination processing, and storage processing in processing of controlling the specific data acquisition apparatus among the plurality of different pieces of processing.

In the acquisition processing, the first processor 301 acquires from the specific data acquisition apparatus time series data on a series of positions, images, and voices of a fourth object that has been collected since the specific data acquisition apparatus detected the fourth object, as data on the fourth object.

Further, in the determination processing, the first processor 301 determines whether or not the third object and the fourth object are identical to each other based an image of the third object in the data on the third object stored in the first storage device 302 and an image of the fourth object in the data on the fourth object acquired through the acquisition processing.

Further, in the storage processing, the first processor 301 stores the data on the fourth object and the data on the third object into the first storage device 302 in association with each other when the determination processing results in a determination that the third object and the fourth object are identical to each other, or stores the data on the fourth object and the data on the third object into the first storage device 302 without associating those pieces of data with each other when the determination processing results in a determination that the third object and the fourth object are not identical to each other.

With this, it is possible to associate the data on the third object acquired through any one of the plurality of different pieces of processing (e.g., sales support) with the data on the fourth object acquired through other processing of the plurality of different pieces of processing (e.g., guidance). As a result, it is possible to identify when and where individual objects are present while enabling cooperation among the plurality of different pieces of processing.

Further, the fourth object may be associated with the first object that does not contain time series data on voices through execution of the acquisition processing, determination processing, and storage processing. Similarly, the second object may be associated with the third object that contains time series data on voices through execution of the acquisition processing, determination processing, and storage processing.

Further, the first processor 301 executes recognition processing of recognizing the fourth object as a person based on features of an image of the fourth object in the processing of controlling the specific data acquisition apparatus among the plurality of different pieces of processing. The recognition processing, for example, corresponds to the person's image detection/recognition program 311 and the face detection/ recognition program 312. As a result, the object is identified as a person.

Further, the first processor 301 executes acquisition processing, recognition processing, and transmission processing in the processing of controlling the specific data acquisition apparatus among the different pieces of processing. In the acquisition processing, the first processor 301 acquires from the specific data acquisition apparatus time series data on a series of positions, images, and voices of a fifth object that has been collected since the specific data acquisition apparatus detected the fifth object present in a predetermined range of distance from the fourth object, as data on the fifth object. The fifth object is, for example, a person Hb, who is a clerk, having a conversation with the fourth object (person Ha). In the recognition processing, the first processor 301 recognizes the fifth object as a person based on features of an image of the fifth object. In the transmission processing, the first processor 301 transmits, to a terminal of the fifth object, data on the fourth object in a time frame in which the fifth object is present within the predetermined range of distance from the fourth object.

With this, the person Hb, who is a clerk, can check when, where, and with whom the person Hb had a conversation, and details of the conversation. Further, the person Hb can refer to the data on the person Ha in the individual person DB 946, and thus can also check a chronological movement trajectory of the person Ha in the space 1. Therefore, the person Hb can recognize the taste of the person Ha and take advantage of the knowledge for sales.

Further, the first processor 301 acquires information input from a terminal in the acquisition processing, and stores the input information and the data on the fourth object in association with each other in the storage processing in the processing of controlling the specific data acquisition apparatus among the different pieces of processing.

Further, the specific data acquisition apparatus is the robot 20 movable in the space 1, and the first processor 301 executes the acquisition processing when the specific data acquisition apparatus detects that a person is approaching in the processing of controlling the specific data acquisition apparatus among the different pieces of processing. With this, the robot 20 can execute the above-mentioned guidance task for the person approaching the robot 20.

Further, the specific data acquisition apparatus is the robot 20 movable in the space 1, and when the specific data acquisition apparatus detects a person, the first processor 301 causes the robot 20 to move toward the person, and executes the acquisition processing in the processing of controlling the specific data acquisition apparatus among the different pieces of processing. With this, the robot 20 can approach the person and execute the above-mentioned sales support task.

It should be noted that this invention is not limited to the above-mentioned embodiments, and encompasses various modification examples and the equivalent configurations within the scope of the appended claims without departing from the gist of this invention. For example, the above-mentioned embodiments are described in detail for a better understanding of this invention, and this invention is not necessarily limited to what includes all the configurations that have been described. Further, a part of the configurations according to a given embodiment may be replaced by the configurations according to another embodiment. Further, the configurations according to another embodiment may be added to the configurations according to a given embodiment. Further, a part of the configurations according to each embodiment may be added to, deleted from, or replaced by another configuration.

Further, a part or entirety of the respective configurations, functions, processing modules, processing means, and the like that have been described may be implemented by hardware, for example, may be designed as an integrated circuit, or may be implemented by software by a processor interpreting and executing programs for implementing the respective functions.

The information on the programs, tables, files, and the like for implementing the respective functions can be stored in a storage device such as a memory, a hard disk drive, or a solid state drive (SSD) or a recording medium such as an IC card, an SD card, or a DVD.

Further, control lines and information lines that are assumed to be necessary for the sake of description are described, but not all the control lines and information lines that are necessary in terms of implementation are described. It may be considered that almost all the components are connected to one another in actuality.

What is claimed is:

1. A control apparatus, which is configured to control a data acquisition apparatus group comprising at least one data acquisition apparatus configured to acquire a position and an image of an object present in a space to execute a plurality of different pieces of processing for one of the space and the object, the control apparatus comprising:

a processor configured to execute programs relating to the plurality of different pieces of processing;

a storage device configured to store the programs; and a communication interface configured to communicate to and from the data acquisition apparatus group, wherein the storage device is configured to store, when the processor executes any one of the plurality of different pieces of processing, as data on a first object, time series data on a series of positions and images of the first object that has been collected since the at least one data acquisition apparatus detected the first object, and wherein the processor is configured to execute, in each processing of the plurality of different pieces of processing:

acquisition processing of acquiring, from the at least one data acquisition apparatus, as data on a second object, time series data on a series of positions and images of the second object that has been collected since the at least one data acquisition apparatus detected the second object;

determination processing of determining whether or not the first object and the second object are identical to each other based on the images of the first object in the data on the first object stored in the storage device and the images of the second object in the data on the second object acquired through the acquisition processing; and storage processing of storing, when the determination processing results in a determination that the first object and the second object are identical to each other, the data on the second object and the data on the first object into the storage device in association with each other, and when the determination processing results in a determination that the first object and the second object are not identical to each other, the data on the second object and the data on the first object into the storage device without associating the data on the second object with the data on the first object, and wherein the data acquisition apparatus group includes a specific data acquisition apparatus configured to acquire the position, the image, and a voice of the object, wherein the storage device is configured to store, when the processor executes any one of the plurality of different pieces of processing, as data on a third object, time series data on a series of positions, images, and voices of the third object that has been collected since the at least one data acquisition apparatus detected the third object, and wherein the processor is configured to, in processing of controlling the specific data acquisition apparatus among the plurality of different pieces of processing:
acquire, in the acquisition processing, from the specific data acquisition apparatus, as data on a fourth object, time series data on a series of positions, images, and voices of the fourth object that has been collected since the specific data acquisition apparatus detected the fourth object;
determine, in the determination processing, whether or not the third object and the first object, second object or fourth object are identical to each other based on the images of the third object in the data on the third object stored in the storage device and the images of the first object, the second object and the fourth object in the data on the first object, the second object and the fourth object acquired through the acquisition processing; and
store, in the storage processing, when the determination processing results in a determination that the third object and the first object, the second object or fourth object are identical to each other, the data on the first object, the second object or the fourth object, and the data on the third object into the storage device in association with each other, and when the determination processing results in a determination that the third object and the first object, the second object, or the fourth object are not identical to each other, the data on the first object, the second object, or the fourth object and the data on the third object into the storage device without associating the data on the first object, the second object, or the fourth object with the data on the third object.

2. The control apparatus according to claim 1, wherein the processor is configured to execute, in the processing of controlling the specific data acquisition apparatus among the plurality of different pieces of processing:
recognition processing of recognizing whether or not the fourth object is a person based on features of the images of the fourth object; and
the determination processing when the recognition processing results in a determination that the fourth object is a person.

3. The control apparatus according to claim 2,
wherein the communication interface is configured to communicate to and from a terminal, and wherein the processor is configured to, in the processing of controlling the specific data acquisition apparatus among the plurality of different pieces of processing:
acquire, in the acquisition processing, from the specific data acquisition apparatus, as data on a fifth object present in a predetermined range of distance from the fourth object, time series data on a series of positions, images, and voices of the fifth object that has been collected since the specific data acquisition apparatus detected the fifth object;
recognize, in the recognition processing, whether or not the fifth object is a person based on features of the images of the fifth object; and
execute transmission processing of transmitting, to a terminal of the fifth object, data on the fourth object in a time frame in which the fifth object is present within the predetermined range of distance from the fourth object.

4. The control apparatus according to claim 2,
wherein the communication interface is configured to communicate to and from a terminal, and
wherein the processor is configured to, in the processing of controlling the specific data acquisition apparatus among the plurality of different pieces of processing:
acquire, in the acquisition processing, input information from the terminal; and
store, in the storage processing, the input information and the data on the fourth object in association with each other.

5. The control apparatus according to claim 2,
wherein the specific data acquisition apparatus includes a robot movable in the space, and
wherein the processor is configured to execute, in the processing of controlling the specific data acquisition apparatus among the plurality of different pieces of processing, the acquisition processing when the specific data acquisition apparatus detects that the person is approaching.

6. The control apparatus according to claim 2,
wherein the specific data acquisition apparatus includes a robot movable in the space, and
wherein the processor is configured to, in the processing of controlling the specific data acquisition apparatus among the plurality of different pieces of processing:
cause the specific data acquisition apparatus to move to the person when the specific data acquisition apparatus detects the person; and
execute the acquisition processing.

7. A control system, comprising:
a data acquisition apparatus group comprising at least one data acquisition apparatus configured to acquire a position and an image of an object present in a space; and
a control apparatus configured to control the data acquisition apparatus group to execute a plurality of different pieces of processing for one of the space and the object,
the control apparatus comprising:
a processor configured to execute programs relating to the plurality of different pieces of processing;
a storage device configured to store the programs; and
a communication interface configured to communicate to and from the data acquisition apparatus group,
wherein the storage device is configured to store, when the processor executes any one of the plurality of different pieces of processing, as data on a first object, time series data on a series of positions and images of the first object that has been collected since the at least one data acquisition apparatus detected the first object, and wherein the processor is configured to execute, in each processing of the plurality of different pieces of processing:

acquisition processing of acquiring, from the at least one data acquisition apparatus, as data on a second object, time series data on a series of pieces of information on the second object that has been collected since the at least one data acquisition apparatus detected the second object;

determination processing of determining whether or not the first object and the second object are identical to each other based on information on the first object in the data on the first object stored in the storage device and information on the second object in the data on the second object acquired through the acquisition processing; and storage processing of storing, when the determination processing results in a determination that the first object and the second object are identical to each other, the data on the second object and the data on the first object into the storage device in association with each other, and when the determination processing results in a determination that the first object and the second object are not identical to each other, the data on the second object and the data on the first object into the storage device without associating the data on the second object with the data on the first object, and wherein the data acquisition apparatus group includes a specific data acquisition apparatus configured to acquire the position, the image, and a voice of the object, wherein the storage device is configured to store, when the processor executes any one of the plurality of different pieces of processing, as data on a third object, time series data on a series of positions, images, and voices of the third object that has been collected since the at least one data acquisition apparatus detected the third object, and wherein the processor is configured to, in processing of controlling the specific data acquisition apparatus among the plurality of different pieces of processing:

acquire, in the acquisition processing, from the specific data acquisition apparatus, as data on a fourth object, time series data on a series of positions, images, and voices of the fourth object that has been collected since the specific data acquisition apparatus detected the fourth object;

determine, in the determination processing, whether or not the third object and the first object, second object or fourth object are identical to each other based on the images of the third object in the data on the third object stored in the storage device and the images of the first object, the second object and the fourth object in the data on the first object, the second object and the fourth object acquired through the acquisition processing; and store, in the storage processing, when the determination processing results in a determination that the third object and the first object, the second object or fourth object are identical to each other, the data on the first object, the second object or the fourth object, and the data on the third object into the storage device in association with each other, and when the determination processing results in a determination that the third object and the first object, the second object, or the fourth object are not identical to each other, the data on the first object, the second object, or the fourth object and the data on the third object into the storage device without associating the data on the first object, the second object, or the fourth object with the data on the third object.

8. A control method, which is executed by a control apparatus configured to control a data acquisition apparatus group comprising at least one data acquisition apparatus configured to acquire a position and an image of an object present in a space to execute a plurality of different pieces of processing for one of the space and the object, the control apparatus comprising:
a processor configured to execute programs relating to the plurality of different pieces of processing;
a storage device configured to store the programs; and
a communication interface configured to communicate to and from the data acquisition apparatus group, the storage device being configured to store, when the processor executes any one of the plurality of different pieces of processing, as data on a first object, time series data on a series of positions and images of the first object that has been collected since the at least one data acquisition apparatus detected the first object, the control method comprising executing, by the processor, in each processing of the plurality of different pieces of processing:

acquisition processing of acquiring, from the at least one data acquisition apparatus, as data on a second object, time series data on a series of information on the second object that has been collected since the at least one data acquisition apparatus detected the second object;

determination processing of determining whether or not the first object and the second object are identical to each other based on information on the first object in the data on the first object stored in the storage device and information on the second object in the data on the second object acquired through the acquisition processing; and storage processing of storing, when the determination processing results in a determination that the first object and the second object are identical to each other, the data on the second object and the data on the first object into the storage device in association with each other, and when the determination processing results in a determination that the first object and the second object are not identical to each other, the data on the second object and the data on the first object into the storage device without associating the data on the second object with the data on the first object, and wherein the data acquisition apparatus group includes a specific data acquisition apparatus configured to acquire the position, the image, and a voice of the object, wherein the storage device is configured to store, when the processor executes any one of the plurality of different pieces of processing, as data on a third object, time series data on a series of positions, images, and voices of the third object that has been collected since the at least one data acquisition apparatus detected the third object, and wherein the processor is configured to, in processing of controlling the specific data acquisition apparatus among the plurality of different pieces of processing:

acquire, in the acquisition processing, from the specific data acquisition apparatus, as data on a fourth object, time series data on a series of positions, images, and voices of the fourth object that has been collected since the specific data acquisition apparatus detected the fourth object;

determine, in the determination processing, whether or not the third object and the first object, second object or fourth object are identical to each other based on the images of the third object in the data on the third object stored in the storage device and the images of the first object, the second object and the fourth object in the data on the first object, the second object and the fourth object acquired through the acquisition processing; and store, in the storage processing, when the determination processing results in a determination that the third object and the first object, the second object or fourth object are identical to each other, the data on the first object, the second object or the fourth object, and the data on the third object into the storage device in association with each other, and when the determination processing results in a determination that the third object and the first object, the second object, or the fourth object are not identical to each other, the data on the first object, the second object, or the fourth object and the data on the third object into the storage device without associating the data on the first object, the second object, or the fourth object with the data on the third object.

* * * * *